United States Patent [19]

Luger

[11] Patent Number: 4,718,457

[45] Date of Patent: Jan. 12, 1988

[54] DIVERTER VALVE

[76] Inventor: G. William Luger, 1716 Raleigh Dr., Burnsville, Minn. 55337

[21] Appl. No.: 876,453

[22] Filed: Jun. 20, 1986

[51] Int. Cl.⁴ ........................................... F16K 11/052
[52] U.S. Cl. ................................... 137/875; 251/298; 251/361
[58] Field of Search ........... 137/867, 875, 527, 625.44; 251/298, 360, 361

[56] References Cited

U.S. PATENT DOCUMENTS

| | | | |
|---|---|---|---|
| 989,175 | 4/1911 | Moeller et al. | 137/875 X |
| 1,265,807 | 5/1918 | Moe | 251/298 X |
| 1,647,036 | 10/1927 | Dileo | 251/298 |
| 2,040,930 | 5/1936 | Frisch | 137/875 X |
| 2,454,160 | 11/1948 | Greene | 251/361 X |
| 3,270,775 | 9/1966 | Alderson | 137/875 X |
| 3,946,986 | 3/1976 | Sutter et al. | 251/298 |

Primary Examiner—Martin P. Schwadron
Assistant Examiner—John C. Fox
Attorney, Agent, or Firm—Kinney & Lange

[57] ABSTRACT

A diverter valve has a "Y" shape with a single inlet and two branch passageways formed at a confluence region of the "Y". A double sealing member paddle is pivoted on a shaft and located at the confluence of the two branches. The branches each have a replacement tapered seal seat. Rotation of the shaft in one direction forces one sealing member of the paddle onto one seat for full 360° contact with the seat. Rotation of the shaft in the other direction forces the other sealing member of the paddle onto the other seat. A continuous peripheral seal contact is made with the seat. The seals and seats are concentric with the branch passageways and easily machineable and replaceable. The arrangement provides for smooth flow through the valve.

4 Claims, 3 Drawing Figures

DIVERTER VALVE

BACKGROUND OF THE INVENTION

1. Field of the Invention

This invention pertains to systems for pneumatic conveying material through pipelines, and more particularly to a valve for diverting the flow from one line to another.

2. Description of the Prior Art

Diverter valves has been used in pneumatic conveying systems for diverting flow from one conduit or line to another.

There are several of the rotating plug type valves which have elements that rotate in a housing within close clearances and have sealing means around matching ports. If the clearances are close enough to prevent leaking, the valve is subject to seizing in use. If the clearances are opened up, then the valve is subject to leakage of product through the clearances, and possible jamming when a particle lodges in the clearance space. These valves cannot be used on high pressure applications either. Examples of this type of valve are shown in U.S. Pat. Nos. 3,199,537; 3,489,178; 4,264,244; and 4,449,863.

Another commonly used valve is the paddle type, which has a shaft rotatably mounted at the junction or confluence of the two branch lines and a valve paddle attached to the shaft. The paddle of the prior art devices is elongated and shaped like a half ellipse, and in its two positions it rests against opposite, inner surfaces of the housing to divert flow into branch lines or conduits. Resilient material attached to the paddle or to the inner surface of the housing is used for effecting a seal. Because of its part ellipse shape, the corner where the ellipse shape meets the shaft mounting the paddle is a dead spot as far as sealing and can withstand only low pressure before leaking. Replacement of worn parts also is a problem and thus service life is limited. Examples of this type of valve are U.S. Pat. Nos. 3,384,421 and 3,773,062.

Both types of valves mentioned above can only be used effectively at pressures of about 25 psig or below.

There are also pivoted paddle type valves with a paddle that has a double sealing member sealing against a circular seat for use primarily in liquid systems. In these valves normally only the sealing member or the seat are replaceable, but not both members. Normally, the seal and seat joint are formed by flat faces that easily may be held apart by small particles that lodge on one of the faces. These type of valves do not have a smooth flow through valve and they have deep recesses or pockets formed in the valve housing and there is direct impingement of stream flow against the seat. Examples of this type of valve are shown in U.S. Pat. Nos. 260,490; 271,491; 752,439; 778,778; 1,040,548; 1,480,070; 2,035,747; 3,636,980; and 4,450,867.

SUMMARY OF THE INVENTION

This invention provides a paddle type diverter valve for fluid conveying systems for conveying particulate materials in which the seals and seats are circular in shape for positive sealing around the entire periphery of the seat. The seats are easily machined and easily hardened, if necessary. Flow impingment on the seat is at a low angle which reduces wear and allows the seal to move into place without trapping conveyed particles. Both the paddle and the seat members are easily replaced, and can withstand very abrasive flow. The flow path is smooth through the valve into both branch lines or conduits.

In the preferred embodiment two seals are attached to opposite sides of a pivoting valve paddle and are circular in shape. The seals are constructed of an elastomeric material that will conform to compensate for wear. The seals are simple and low cost to manufacture and easy to replace.

The seal formed by seat and valve members is circular and continuous for a full 360°. Moderate turning force on the shaft mounting the paddle shaft will give a zero clearance seal effective under pressues of 250 psig or higher with no leakage. The periphery of the paddle is designed to have a continuous seal line that is not broken or disrupted.

As shown, the "Y" shaped valve has one position that is essentially "straight through" from the inlet to the outlet. The straight through position of the valve body has smooth, low profile surfaces to offer low resistance to flow and consequently, low wear.

It is contemplated that the diverter valve will be used in material handling systems using air as the conveying medium and handling all materials encountered in these systems such as flour, grain, cement, alumina, coal, sugar, plastics and many more. The valve will operate at pressures from 1 to 150 psig. The valve can also be used in liquid slurry systems handling slurrys of the materials conveyed at the same pressure range.

The construction of the valve of the present invention is relatively simple and inexpensive, yet highly effective and versatile.

DETAILED DESCRIPTION OF THE PREFERRED EMBODIMENTS

Figure 1:
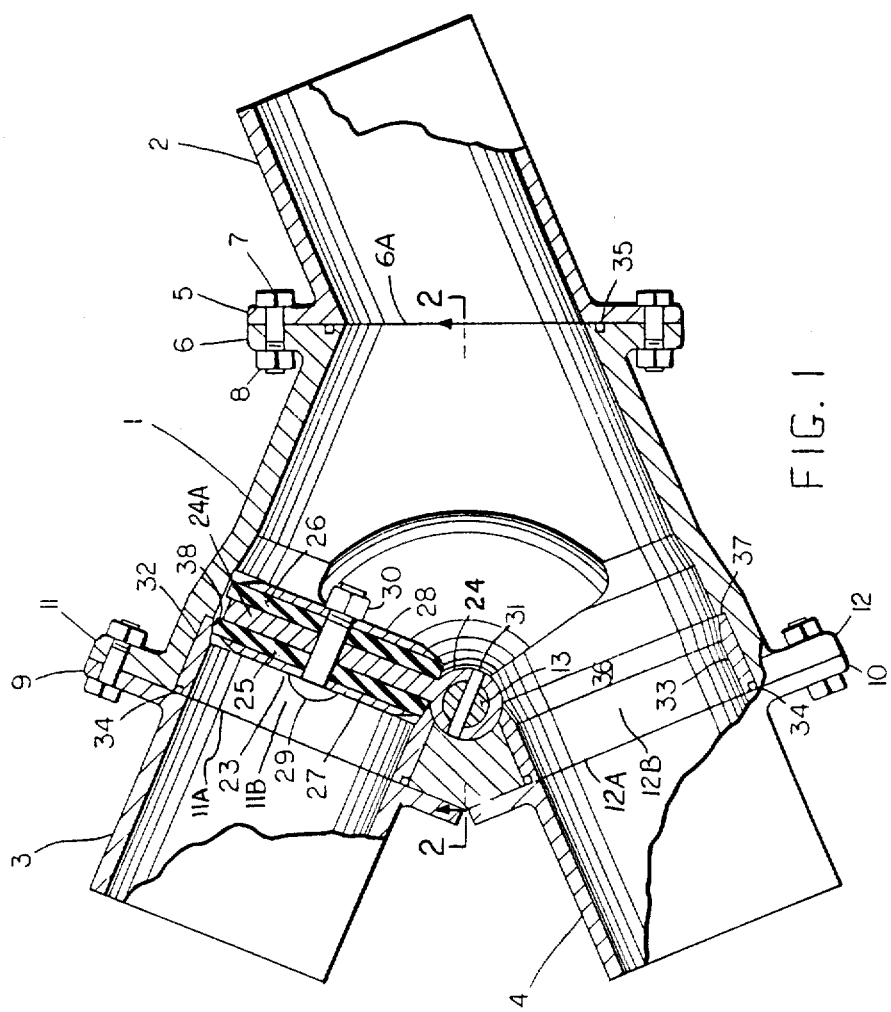
FIG. 1 is a top view of a diverter valve constituting a preferred embodiment of the invention with parts in section and parts broken away.
Figure 2:
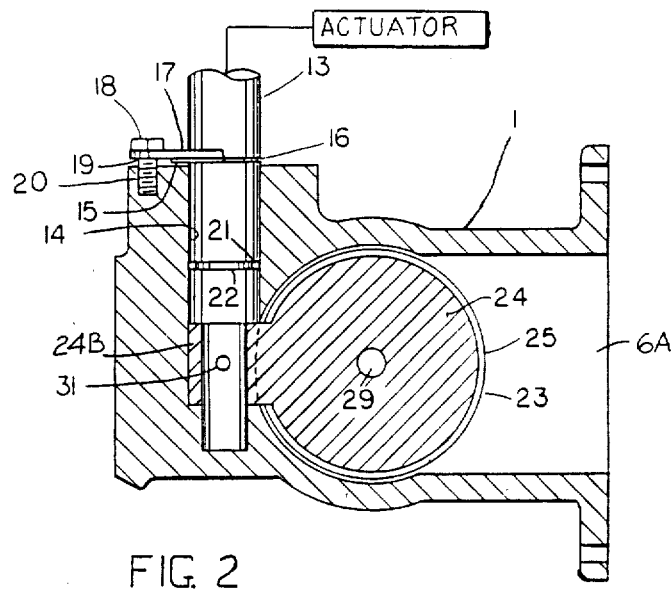
FIG. 2 is a sectional view of the valve of FIG. 1 taken along line 2—2, except the paddle assembly has been rotated to position along line 2—2 for this view.

The embodiment of the invention as shown in FIGS. 1 and 2 has a cast main body section 1 coupled to an inlet connection line or pipe 2 and two branch outlet connection pipes 3 and 4. The inlet pipe 2 has a connector flange 5 that is bolted to a flange 6 surrounding an inlet opening 6A of the body section 1. The interior of the housing adjacent inlet 6A forms an inlet conduit portion of the housing. The flanges 5 and 6 are coupled together by bolts 7 and nuts 8. Similarly the outlet connection lines or pipes have connector flanges 9 and 10 which are bolted to outlet flanges 11 and 12 of the body 1. The outlet flanges surround outlet openings 11A and 12A. The outlet openings lead from branch conduits 11B and 12B in the valve body aligning with branch lines or pipes 3 an 4.

A shaft 13 is rotatably mounted in a central bore 14 formed in a portion of the housing 1 adjacent the junction of the branch conduits 11B and 12B. The shaft 13 rotates 135° by use of an actuator 13A such as a manual handle or by a power operator such as an electric motor, air cylinder or hydraulic cylinder, as is conventional.

As shown in FIG. 2, the shaft 13 is held in place against force of conveying pressure by a snap ring 15 positioned in a groove 16 which is held down by a circular plate 17 bearing on the snap ring. The plate 17 is held with a machine screw 18 extending through a hole 19 in plate 17 and into a tapped hole 20 in body 1. To prevent fluid leakage around the shaft 13 there is an "O" ring 21 in a shaft groove 22.

A paddle assembly 23 is attached to shaft 13 and rotates with the shaft on the interior of the housing 1. The paddle assembly includes a paddle weldment 24 having a paddle blade 24A and a hub 24B that mounts over shaft 13. Elastomeric seals 25 and 26 are positioned on opposite sides of the blade 24A and held in place with identical backup plates 27 and 28. The backup plates 27 and 28 seals 25 and 26 are fastened to the paddle weldment 24 by bolt 29 and locknut 30. The paddle assembly is held onto shaft 13 by pin 31. The seals 25 and 26 each have a continuous peripheral seal edge and the seal line is unbroken across the hub 24B as shown in dotted lines in FIG. 2.

Two identical tapered valve seats 32 and 33 are held in the branch conduits or lines of the body 1. To prevent leakage through mating flange faces 9 and 11, and 10 and 12, there is an "O" ring 34 in a groove in the end of each seat 32 and 33. To prevent leakage through flange faces 5 and 6 there is an "O" ring 35 in a groove provided in body flange 6, which seals against the flange surface 5 of inlet connection pipe 2. The valve seat 32 has a valve seat surface 38 that faces toward the inlet and tapers inwardly in the direction of flow. The valve seat 33 has a tapered seat surface 36 that also tapers inwardly in the direction of flow.

It can be seen from the drawings that the body is oriented so there is a main passageway through inlet connector pipe 2 and the interior of body 1 which substantially aligns with outlet conduit 12B and branch outlet pipe 4. The passageway formed is a smooth passageway without any sharp edges. The flow of fluid entrained particulate product against the valve seats in the branch conduits or lines 11B and 12B carrying the flow is very gentle, as the valve seat surface 36 (or 38) is at a low angle to the direction of flow or movement of the product. Also, end face 37 of seal seat 33 in branch conduit 12B is recessed into the wall of the housing 1 at the entrance end and is not in direct contact with moving material. The end of seat 32 facing the flow is also recessed into the housing wall so flow through the seat engages the tapered seat surface 38. The contact angle between the material conveyed and the valve seat surfaces 36 or 38 is very gentle and wear is at a minimum. Also, when the valve is in normal "through" position as shown in FIG. 1, the complete paddle assembly 23 is out of the direct path of material flowing through the valve, thereby reducing wear on the paddle assembly. In the normal position, the flow out of the valve is along the axis of passageway 12B, which coincides with the axis of flow of the incoming material.

The housing surfaces are enlarged adjacent the outlet opening to form shoulders against which the ends of the seal members 32 and 33 abut. The seal members can be inserted and removed through the outlet openings.

In operation the shaft 13 is rotated by suitable means such as an actuator shown schematically at 13A, and when in a first working position the periphery of seal 25 is forced against valve seat 32, as shown in FIG. 1. It will be noticed that this is a full 360° seal around a complete circle formed on the valve seat and that there is no break or irregularity in the sealing line to permit fluid and the carried product to leak into branch outlet pipe 3. It is a positive, peripheral, zero clearance seal. By rotating shaft 13 using actuator 13A to a second position shown in FIG. 3, the seal 26 will be forced against surface 36 of valve seat 33 in an identical manner. The valve shaft 13 rotates about 135° between the two positions. The seal seats a full 360° (an unbroken peripheral seal is found) around the seat 33 to positively close the outlet to branch pipe 4. The seals contact the respective seats at a line downstream from a notch formed to clear hub 24A.

Figure 3:
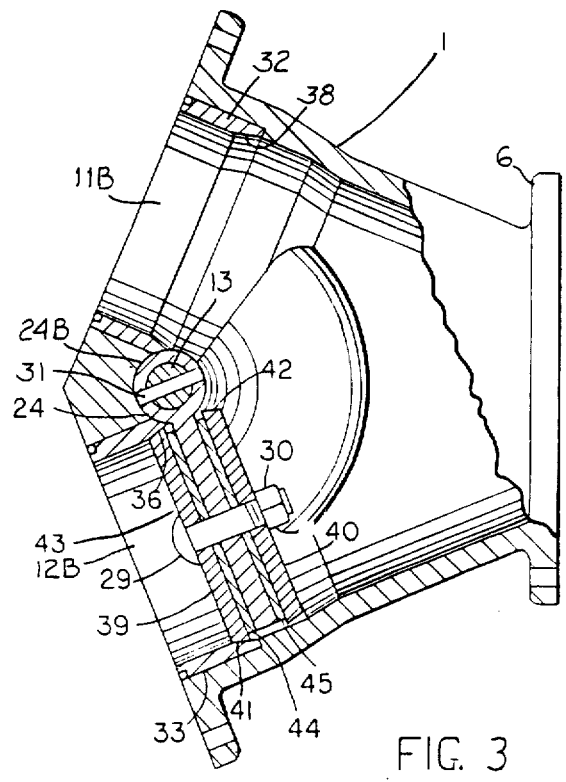
FIG. 3 is a partial view of the paddle assembly and seat showing a different embodiment of the seal and with the valve rotated to a second position.

Another embodiment of the seals used in the invention is shown in FIG. 3 in which seals 39 an 40 are composed of a solid material such as steel and have beveled outer edge surfaces 41 and 42. In the closed position as shown in FIG. 3, the seal is effected by contact of tapered surface 36 of valve seat 33 against tapered suface 41 of seal 39. It can be seen from FIG. 3 that the mating conical sealing surfaces extend for a substantial distance ($\frac{1}{8}$" to $\frac{1}{4}$") effecting a tight positive seal. The pressure in the valve body also tends to force the seal tighter. The paddle assembly 43 includes paddle weldment 24, solid seals 39 and 40, and disc like spacers 44 and 45. The spacers 44 and 45 can be varied in thickness to permit seal adjustment if desired. The seal components are held together by bolt 29 and locknut 30.

The seats 32 and 33 can be easily replaced by removing the corresponding branch conduits 3 or 4 so the seat can be slid out of its bore in the valve housing. The branch outlet conduits will abut against the respective seal members to hold the seal members in place (through O rings 34) when the branch conduits are fastened in place. In a similar manner the seals on the paddle can easily be replaced by removing one bolt that is accessible from the inlet and outlet opening of the valve. With the paddle in position as shown in FIG. 3, the bolt is accessible with conduits 2 and 4 removed from flanges 6 and 12.

While the preferred embodiments of the invention have been shown and described, it will be obvious that various modifications are possible without departure from the spirit of the invention. Other valve body, seal and seal configurations might also be used such as the seal and seal seat can be the shape of an ellipse. Also the seal and seat materials can be different. The seal seat 32 and 33 can be an elastomeric material. The seal on the paddle also can be a thin sheet of spring steel.

In view of these and other possible modifications, the invention is not intended to be limited by the showing or description herein, or in any other manner except insofar as may be required.

What is claimed is:

1. A diverter valve assembly comprising:
   a housing defining an inlet conduit for providing material flow and first and second branch conduits joining the inlet conduit at a junction region, the housing having means for attaching separate outlet pipes in alignment with each branch conduit and having interior surfaces defining a smooth flow path between the inlet conduit and the branch conduits;
   a padle pivotally mounted on the housing at the junction region and movable between a first position in which said paddle prevents flow from the inlet conduit to the first branch conduit while permitting flow through the second branch conduit, and a second position in which the paddle prevents flow from the inlet conduit to the second branch conduit while permitting flow through the first branch conduit;

sealing means comprising a separate flat resilient disc member on each side of said paddle, each disc member defining a continuous peripheral seal; and a separate valve seat member removably mounted in each branch conduit adjacent the junction region and each valve seat member having tapered surfaces reducing in opening size in direction of material flow, the tapered surfaces merging smoothly with the interior surface of the housing and each defining a continuous peripheral valve seat surface defining the only opening from the inlet conduit to the respective branch conduits, the flat disc member on each side of the paddle selectively engaging an associated tapered seal surface to effect seals in the respective first and second positions of the paddle, the valve seat members comprising tube sections removable from the housing in direction of extension of the respective branch conduits and being clamped in position for use when outlet pipes are fastened to the housing.

2. A diverter valve comprising:

a housing defining an inlet opening and having interior surface means defining a passageway leading from the inlet opening and forming a pair of second passageways having branch outlet openings, the second passageways separating at a junction region;

a paddle pivotally mounted in the housing at the junction region and movable between a first position in which said paddle prevents flow from the inlet opening to a first branch outlet opening while permitting flow through the second branch outlet opening, and a second position in which the paddle prevents flow from the inlet opening to the second branch outlet opening while permitting flow through the first branch outlet opening;

sealing means defining a continuous peripheral seal on both sides of said paddle; and a separate valve seat member in each second passageway adjacent the junction region, and each valve seat member forming a a continuous peripheral valve seat surface defining the respective branch outlet openings, and positioned to provide a seat for the seals in the respective first and second positions of the paddle, said valve seat surfaces tapering to smaller size in the direction of movement of material through the housing, the seat surfaces merging smoothly with the interior surface of the housing to avoid surface irregularities at the junction of the housing and respective valve seat members.

3. A valve according to claim 2 wherein the housing interior surface means surrounding each of the second passageways is enlarged adjacent the branch outlet openings to form shoulders, the seat members fitting within the respective branch outlet openings so the seat members recess against the respective shoulder, the seat surfaces smoothly mating with the exterior surfaces of the housing at the shoulders formed.

4. A diverter valve as claimed in claim 2 wherein the valve seat members comprise annular tube sections and are removable from the housing through the respective outlet openings, and a pair of branch pipes coupled to the housing and aligning with each branch outlet opening, the branch pipes each abutting against the outer end of one of the respective annular tube sections forming the seats of the valves, when the branch pipes are coupled to the housing to hold such annular tube members in position within the housing.

* * * * *

UNITED STATES PATENT AND TRADEMARK OFFICE
CERTIFICATE OF CORRECTION

PATENT NO. : 4,718,457
DATED : January 12, 1988
INVENTOR(S) : G. William Luger

It is certified that error appears in the above-identified patent and that said Letters Patent is hereby corrected as shown below:

Column 4, line 66, delete "padle" and insert --paddle--.
Column 6, line 9, delete second occurrence of "a".

Signed and Sealed this

Seventh Day of June, 1988

Attest:

DONALD J. QUIGG

Attesting Officer

Commissioner of Patents and Trademarks